United States Patent [19]
Vinson et al.

[11] Patent Number: 5,238,639
[45] Date of Patent: Aug. 24, 1993

[54] METHOD AND APPARATUS FOR STEREOLITHOGRAPHIC CURL BALANCING

[75] Inventors: Wayne A. Vinson; Joseph W. Allison, both of Valencia; Paul F. Jacobs, La Crescenta; Dennis R. Smalley, Baldwin Park, all of Calif.

[73] Assignee: 3D Systems, Inc., Valencia, Calif.

[21] Appl. No.: 939,549

[22] Filed: Aug. 31, 1992

Related U.S. Application Data

[63] Continuation of Ser. No. 607,042, Oct. 31, 1990, abandoned.

[51] Int. Cl.$^5$ .................... B29C 35/08; B29C 41/02
[52] U.S. Cl. .................... 264/22; 118/620; 118/712; 156/54; 156/273.5; 156/275.5; 156/307.1; 156/378; 156/379.6; 250/492.1; 264/40.1; 264/308; 365/106; 365/107; 425/135; 425/174.4; 427/8; 427/508; 427/553; 427/554

[58] Field of Search ............ 264/22, 40.1, 255, 308; 425/135, 174, 174.4; 156/64, 242, 273.3, 273.5, 275.5, 307.1, 378, 379.6; 427/8, 393.5, 407.1, 412.1, 430.1, 508, 553, 554; 118/423, 428, 429, 620, 712; 250/432 R, 492.1; 364/468, 476; 365/106, 107, 119, 120, 126, 127; 395/119; 430/270, 327, 328

[56] References Cited

U.S. PATENT DOCUMENTS

| 4,575,330 | 3/1986 | Hull | 425/174.4 |
| 4,929,402 | 5/1990 | Hull | 264/22 |
| 5,104,592 | 4/1992 | Hull et al. | 264/22 |

Primary Examiner—Leo B. Tentoni
Attorney, Agent, or Firm—Lyon & Lyon

[57] ABSTRACT

A method and apparatus for eliminating or substantially reducing curling effects in stereolithographically formed objects. Synergistic stimulation is applied to a curable material to form a three dimensional object through the build up of successive layers. Curling between successive layers is eliminated or substantially reduced by curing a balancing layer in relation to a balanced layer such that reverse curl of the balanced layer caused by the balancing layer offsets or negates normal curl of the balanced layer caused by the balancing layer.

26 Claims, 7 Drawing Sheets

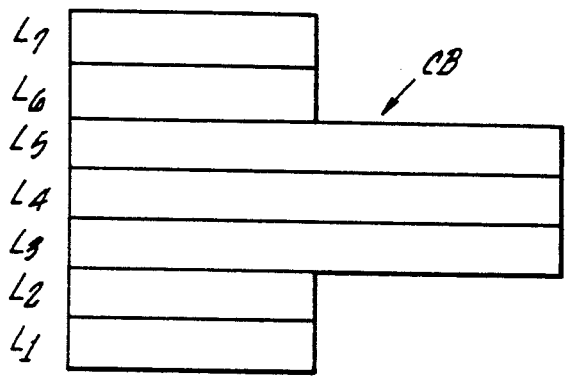
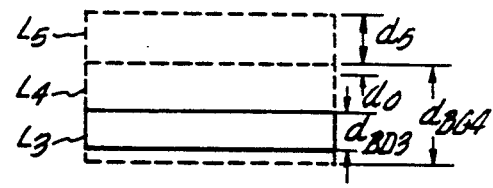
FIG. 9A.
FIG. 9B.
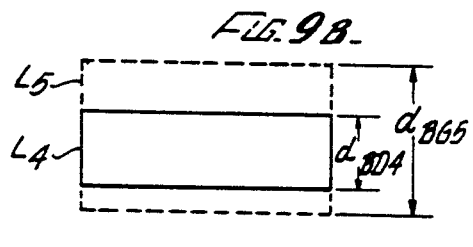
FIG. 9C.
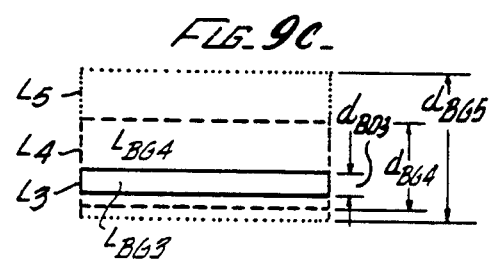
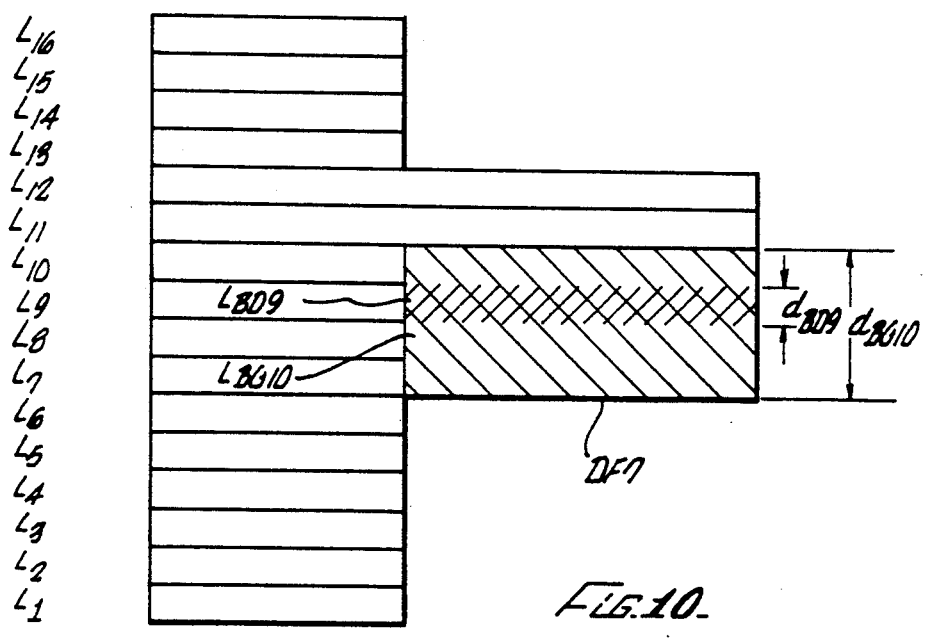
FIG. 10.

METHOD AND APPARATUS FOR STEREOLITHOGRAPHIC CURL BALANCING this is a continuation of co-pending application Ser. No. 07/607,042, filed on Oct. 31, 1990, now abandoned.

BACKGROUND OF THE INVENTION

This invention relates generally to improvements in methods and apparatus for forming three-dimensional objects from a fluid-like medium and, more particularly, to a new and improved stereolithography system involving the application of enhanced data manipulation and lithographic techniques to production of three-dimensional objects, whereby such objects can be formed more rapidly, reliably, accurately and economically, and with reduced stress and curl.

In recent years, "stereolithography" systems, such as those described in U.S. Pat. No. 4,575,330 entitled "Apparatus For Production Of Three-Dimensional Objects By Stereolithography," and U.S. Pat. No. 4,929,402 entitled "Methods For Production of Three-Dimensional Objects By Stereolithography" which are hereby fully incorporated by reference herein as though set forth in full, have come into use. Basically, as practiced in one embodiment, stereolithography is a method for automatically building complex plastic parts by successively printing cross-sections or layers of photopolymer (such as liquid plastic) on top of each other until all of the thin layers are formed and joined together to form a whole part. With this technology, the parts are literally grown in a vat of photopolymer liquid plastic. This method of fabrication is extremely powerful for quickly reducing design ideas to physical form and for making prototypes.

Photocurable polymers change from liquid to solid in the presence of light and their photospeed with ultraviolet light (UV) is fast enough to make them practical building materials. The material that is not polymerized when a part is made is still usable and remains in the vat as successive parts are made. An ultraviolet (UV) laser generates a small intense spot of UV. This spot is guided across the liquid surface with a galvanometer mirror X-Y scanner. The scanner is driven by computer generated vectors or the like. Precise complex patterns can be rapidly produced with this technique.

The laser scanner, photopolymer vat, elevator along with a controlling computer and a separate or combined slicing computer combine together to form a stereolithography apparatus, referred to as an "SLA." An SLA is programmed to automatically make a plastic part by drawing a cross section at a time, and building the part up layer by layer.

Stereolithography represents an unprecedented way to quickly make complex or simple parts without tooling. Since this technology depends on using a computer to generate its cross-sectional patterns, there is a natural data link between CAD/CAM. However, such systems have encountered difficulties relating to shrinkage, stress, curl and other distortions, as well as resolution, accuracy and difficulties in producing certain object shapes.

Objects made using stereolithography tend to distort when the materials used change density between the untransformed state (e.g. liquid state) and the transformed state (e.g. solid state). This density change causes material shrinkage or expansion generating stress in a part as it is formed such that lower layers or adjacent structures tend to "curl" giving an overall distortion to the part. Materials with less density change exhibit less curl, but many materials that are otherwise useful for stereolithography have high shrinkage.

The term "curl" is used to describe an effect similar to that found when applying coatings to such things as paper. When a sheet of paper is coated with a substance that shrinks, it curls up toward the coating. This is because the coating both shrinks and sticks to the sheet, and exerts a pulling force on the top but not on the bottom of the sheet. A sheet of paper has insufficient restraining force to resist this pulling. The same phenomenon occurs when a photopolymer is cured on top of a thin layer of already cured photopolymer. The "curl" effect limits the accuracy of the object formation by stereolithography.

Material shrinkage is a common problem with polymer materials, and with fabrication methods (such as plastic molding) that use these materials. However, stereolithography is a new technology, and the problems associated with distortion due to shrinkage are only beginning to be addressed. Additional details about stereolithography are available in the following co-pending U.S. patents and U.S. Patent applications, all of which, including appendices, are hereby fully incorporated by reference herein as though set forth in full:

| APPLICATION SER. NO. | FILING DATE | INVENTORS | STATUS |
| --- | --- | --- | --- |
| 07/182,801 | April 18, 1988 | Hull et al. | U.S. Pat. No. 4,999,143 |
| 07/182,830 | April 18, 1988 | Hull et al. | U.S. Pat. No. 5,059,359 |
| 07/183,015 | April 18, 1988 | Smalley | U.S. Pat. No. 5,015,424 |
| 07/183,016 | April 18, 1988 | Modrek | U.S. Pat. No. 4,996,010 |
| 07/268,429 | November 8, 1988 | Modrek, et al. | U.S. Pat. No. 5,076,974 |
| 07/268,816 | November 8, 1988 | Spence | U.S. Pat. No. 5,058,988 |
| 07/268,837 | November 8, 1988 | Spence, et al. | U.S. Pat. No. 5,123,734 |
| 07/268,907 | November 8, 1988 | Spence et al. | U.S. Pat. No. 5,059,021 |
| 07/331,644 | March 31, 1989 | Hull et al. | Allowed |
| 07/365,444 | June 12, 1989 | Leyden et al. | Allowed |
| 07/339,246 | April 7, 1989 | Hull et al. | U.S. Pat. No. 5,104,592 |
| 07/428,492 | October 27, 1989 | Vorgitch et al. | Abandoned |
| 07/429,435 | October 30, 1989 | Smalley et al. | Allowed |
| 07/429,911 | October 27, 1989 | Spence et al. | Allowed |
| 07/515,479 | April 27, 1990 | Almquist et al. | Allowed |

Additional details of stereolithography are also available in three related applications. The disclosures of these three additional applications are hereby fully incorporated by reference herein as though set forth in full.

The first of these is U.S. patent application Ser. No. 07/606,802 entitled "Simultaneous Multiple Layer Curing for Forming Three-Dimensional Objects," filed by Smalley et al. This application describes methods of building high resolution objects from traditionally low-resolution combinations of building materials and synergistic stimulation. These combinations result in a minimum effective cure depth which is typically too deep to form the thin layers required for high resolution objects. The objective of this referenced invention is accomplished by delaying the exposure of a particular area on a cross-section that would negatively impact resolution if immediately cured along with formation of the rest of the cross-section. Resolution may be negatively impacted by the cure depth involved, for example, when material below the cross-section is inadvertently cured upon exposure of the area. Therefore, to preserve resolution exposure of the particular area is delayed until corresponding areas on higher level cross-sections are subsequently exposed. The higher level cross-sections are chosen such that the cure depth is deep enough to cure the desired volumes (areas) without inadvertently curing material on lower cross-sections. The processes of this referenced application are similar to those of the instant invention in their curing of portions of lower layers from higher layers by application of cure depths substantially greater than one layer thickness.

The second of these is U.S. patent application Ser. No. 07/605,979 entitled "Improved Surface Resolution in Three-Dimensional Objects by Inclusion of Thin Fill Layers," filed by Smalley et al. This application describes methods for forming high resolution objects by filling surface discontinuities inherent in three-dimensional objects formed from stereolithography with thin fill layers.

The third of these is U.S. patent application Ser. No. 07/606,191 entitled "Boolean Layer Comparison Slice," filed by Snead et al. This application describes the use of Boolean operations in determining (1) which portions of a layer continue from a previous layer through a present layer and through the next successive layer and (2) which portions of the layers are up-facing or down-facing or both. Therefore, this application describes methods and apparatus for comparing initial data associated with each layer and for comparing such data between layers to form resulting data that will be used in the process of physically reproducing the object. Additionally, this application describes the use of such operations to yield the appropriately sized objects (e.g. undersized or oversized). The methods of multiple layer curl balancing, to be described herein are readily implemented following the teachings of this referenced application. The three preceding applications and all appendices and patents mentioned therein are hereby fully incorporated herein by reference as though set forth in full.

As more fully described in several of the references previously listed or discussed, methods and apparatus have been developed to reduce curl which utilize creative stereolithographic building techniques. These building methods include, but are not limited to three concepts or techniques known as the brick and mortar technique (sometimes called tiling), the multipass technique, and the riveting technique.

The brick and mortar curl reduction technique involves curing a fluid-like material such as a liquid resin, transforming a powdered material by sintering or by using a binder to form successive solid portions or bricks that have breaks therebetween and adhere to a lower previously cured layer of material. Forming the layer as a series of isolated cured regions allows the layer to be cured to isolate stress along the layer. In some embodiments, the breaks between the successive bricks are filled with liquid resin and analogized to mortar. The bricks are cured with greater exposure than the mortar. Since the mortar is cured less than the bricks, less shrinkage occurs along this region. Stress is isolated to a greater or lesser extent in the regions of the individual bricks depending on the exposure given to the mortar regions. Thus, curling is significantly isolated to limited regions along the length of a layer.

Although the Brick Concept results in significant curl reduction, it may also result in the creation of relatively weaker parts and a rough surface finish due to the non-curing or limited curing of the mortar. In some instances, post process filling may also be required to fill holes. In other instances, if the mortar is subsequently exposed in order to improve strength, a substantial amount of the curl may be reintroduced.

The multipass curl reduction technique involves incrementally curing a layer of building material (e.g. liquid resin) to a particular depth through multiple passes of the synergistic stimulation (e.g. a UV laser beam) over the building material. The resin is cured such that it does not adhere to an adjacent already-cured lower layer on the initial pass of the UV laser. Instead, adhesion is achieved at a later pass or over the course of several later passes.

Multipass reduces curl in two ways. First, it cures a layer incrementally and enables the top portions of a layer to cure without transmitting stress (by inducing a torque) to previously cured layers. The layers are cured almost to the point of adhering to each other (being separated by a distance of only a few mils). The layers are then adhered to each other in a subsequent or "adhesion" pass. Since only a small amount of the lower portion of the layer is cured on the final pass, less shrinkage is encountered than when curing on a single pass, and therefore less stress is transmitted to the lower layer.

Second, the multipass technique reduces curl because the adhesion pass cures resin sandwiched between a rigid already-cured lower layer, and a rigid (but generally less rigid) already-cured portion of the upper layer. Thus, the curing of this resin will simultaneously introduce stresses to both the upper and lower cured layers, which will tend to cancel each other out.

Although the multipass technique effectively reduces curl, it still may result in some upward curling. Also, this technique may result in what is known as birdnesting which is a distortion that can occur if there are significant delays between the multiple passes. Birdnesting occurs, for example, when resin cured on a particular pass is allowed to float for a long period of time on the surface of a liquid resin before additional passes adhere this cured resin to the layer below. If the delay is long enough, the cured resin floating on the surface of the resin can migrate out of alignment with the lower layer before it is adhered thereto.

In the riveting technique, a cross-section (layer) or portion thereof is transformed using exposures small enough to prevent a newly formed layer from curing deep enough to adhere to a previously formed layer. Next various locations on the newly formed cross-section that overlap cured or transformed locations of the previously formed cross-section are given sufficient additional exposure to extend the cure depth from the lower surface of the newly formed layer to the previously formed layer to adhere them together. Each location that receives an additional exposure comprises only a small cured area. This technique results in a negligible amount of stress transmittal between the layers, thus resulting in little or no curl. For example, a layer of a rail may be built with two parallel walls which are held together by internal hatching vectors, wherein both the walls and hatch are given small enough exposures to prevent the present layer from adhering to the previous layer. The hatch vectors that are then at least partially reexposed form cure to a depth deep enough to cause the layers to adhere at these points of additional exposure (known as rivets) and thereby bond the layers together.

The riveting method is very successful in reducing curl because the rivets tend to induce shrinkage in limited regions along the layer. The shrinkage encountered is less than usual since most of the material being cured is being cured, for a second time and has already undergone a substantial portion of the shrinking process. However, due to the many spaces or breaks between the rivets and the lower structural strength of the individual layers due to their shallow cure depth, this method results in relatively weak parts and layers. Therefore, there are sometimes a number of structural integrity considerations that must be made when building parts.

Although the three techniques described successfully and effectively reduce stress and curl, it must be recognized that, in general, each given application involves a trade-off between structural strength and curl. That is, the higher the structural strength required for a particular application, the more curling that will occur between layers.

It is further noted that although the above-mentioned descriptions of curl and curl reduction techniques are presented with respect to upward vertical curl they are also applicable to other forms of curl, including downward curl when a part is being built upside down, sideways curl when a part is being built sideways, and various forms of horizontal curl (curl in a plane perpendicular to the building axis when lines of transformed material are formed in contact with each other on a single layer).

SUMMARY OF THE INVENTION

The present invention is directed, generally, to an improved stereolithographic method and apparatus for producing a three-dimensional object by applying synergistic stimulation to form successive layers of the object adhered to each other from material curable in response to said synergistic stimulation; and, more specifically, to a method and apparatus for application of enhanced data manipulation and lithographic techniques for producing three-dimensional objects with reduced stress and curl. To this end, a new and improved stereolithography system is provided for generating a three-dimensional object by forming successive and adjacent laminae or layers of the object at the face of a fluid-like medium capable of altering its physical state in response to appropriate synergistic stimulation, information defining the object being specially processed to reduce curl, stress and distortion, and increase resolution, strength and accuracy of reproduction through the alteration of the dimensions of successive and adjacent laminae in relation to each other and automatically integrating the successive laminae as they are formed to define the desired three-dimensional object.

Accordingly, it is an object of the present invention to provide a method and apparatus for curing at least two layers of a three-dimensional object, the other as a balancing layer and the other as a balanced layer, in relation to each other to reduce curling. This is accomplished by curing the balanced layer and then curing the balancing layer in relation to the balanced layer such that reverse curl of the balanced layer caused by the balancing layer substantially offsets or negates normal curl of the balanced layer caused by the balancing layer. This method and apparatus is therefore applicable to balancing curl in all directions of curl such as when an object is built from the formation of successive layers from below or alongside previously formed layers.

Another object of the present invention is to provide a more economical method and apparatus for forming stereolithographic parts by at least partially eliminating support requirements when building parts thereby reducing CAD design time, file sizes and part building time.

Another object of the present invention is to provide a method for determining appropriate building materials that can be used with curl balancing for a given building layer thickness.

Another object of the present invention is to provide a method and apparatus for optimally practicing curl balancing techniques with a single building material for a variety of layer thicknesses.

Other and further objects and advantages will appear hereinafter.

BRIEF DESCRIPTION OF THE DRAWINGS

FIG. 7A–7D illustrates a variety of cure depths used when transforming or curing the balancing layer and balanced layer of the object shown in FIGS. 6 and 7.

FIG. 9 illustrates a front view of the object of FIG. 7 containing a greater number of building layers and using a three-layer embodiment of curl balancing.

FIGS. 9A–9C illustrate various combinations for transforming a balanced layer relative to a balancing layer in a three-layer embodiment such as illustrated in FIG. 9.

FIG. 10 illustrates a front view of the object of FIG. 7 containing a greater number of building layers and using a four-layer embodiment of curl balancing.

DETAILED DESCRIPTION OF THE PREFERRED EMBODIMENT

Figure 1:
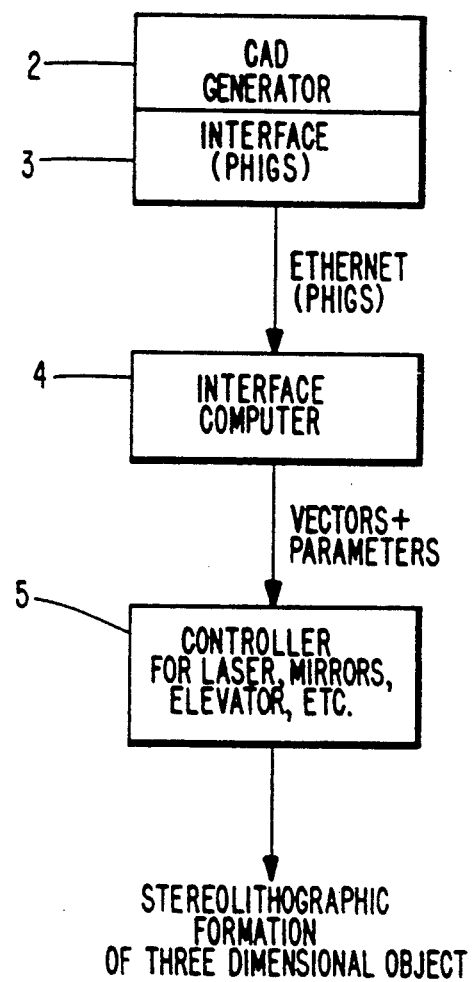
FIG. 1 illustrates a block diagram of an overall stereolithographic system suitable for practicing the present invention.

Turning in detail to FIG. 1, there is shown a block diagram of an overall stereolithography system suitable for practicing the present invention. A CAD generator 2 and appropriate interface 3 provide a data description of the object to be formed (the data may be modified from a desired object configuration for curl balancing purposes), typically in PHIGS format, which is transferred via network communication such as ETHERNET or the like to an interface computer 4 where the object data is manipulated to optimize the data and provide output vectors which reduce stress, curl and distortion, and increase resolution, strength, accuracy, speed and economy of reproduction, even for rather difficult and complex object shapes. The interface computer 4 generates layer vector data by successively slicing, varying layer thickness as needed, rounding polygon vertices, generating boundaries, up- and down-facing flat skins, up- and down-facing near-flat skins, various vector blocks and regions (including curl balanced and balancing blocks and regions), scaling, cross-hatching, offsetting vectors and ordering of vectors and so forth.

The vector data and parameters from the computer 4 are directed to a controller subsystem 5 for operating the system stereolithography laser, mirrors, elevator and the like.

Figures 2, 3:
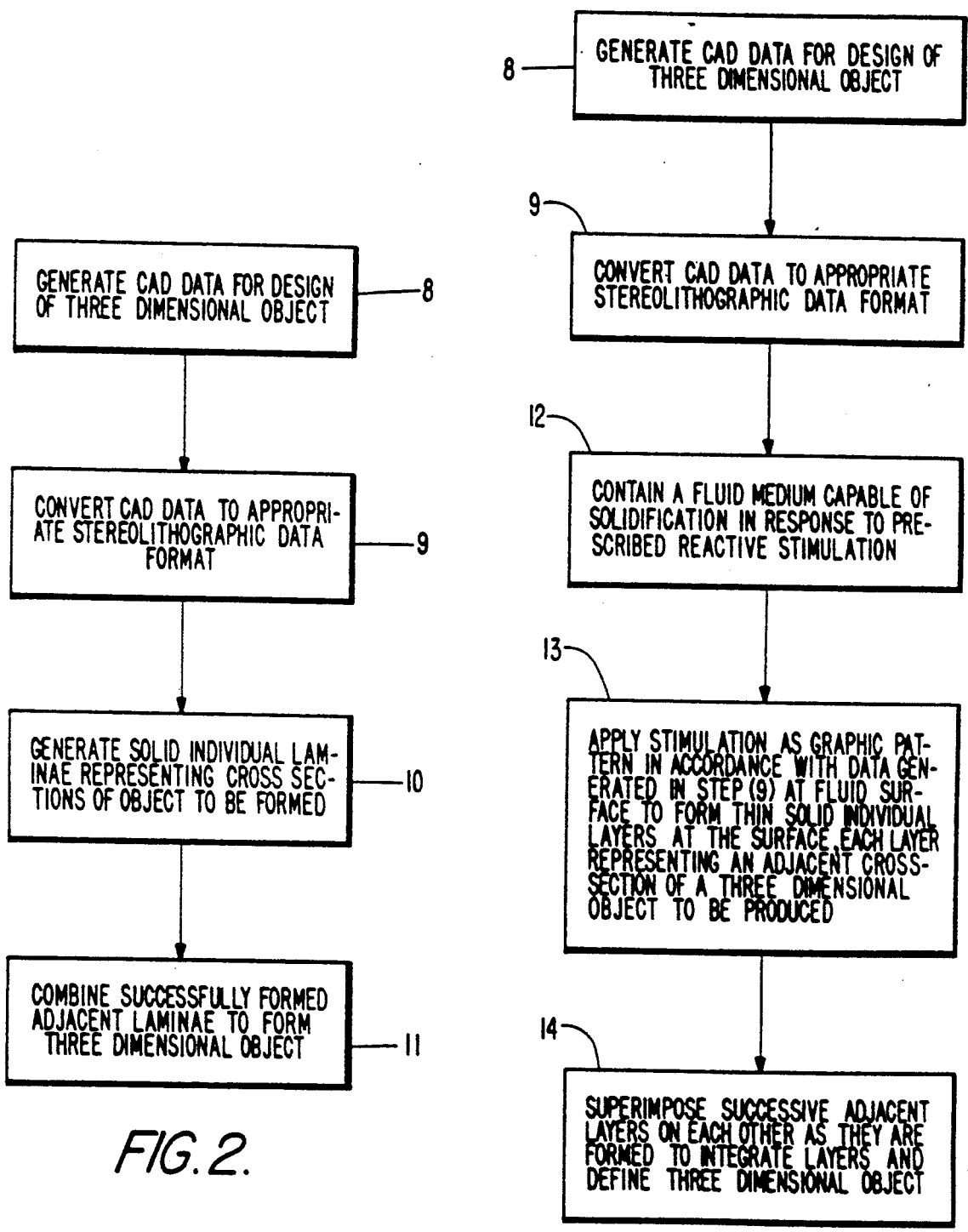
FIGS. 2 and 3 are flow charts illustrating the basic system of the present invention for generating three-dimensional objects by means of stereolithography.
Figure 4:
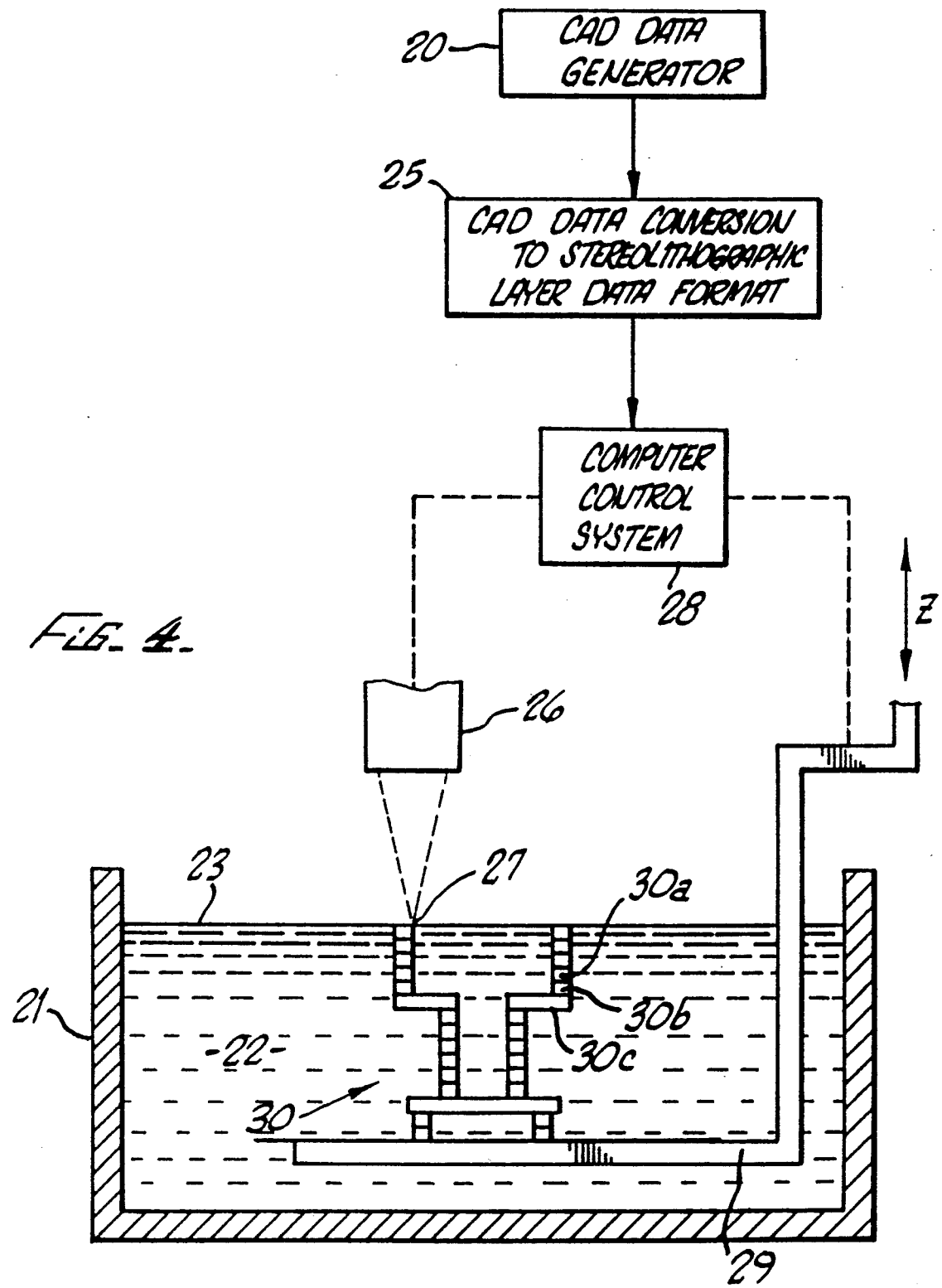
FIG. 4 illustrates an apparatus suitable for implementing the stereolithographic methods illustrated and described by the systems and flow charts of FIGS. 1–3.

FIGS. 2 and 3 are flow charts illustrating the basic system of the present invention for generating three-dimensional objects by means of stereolithography while FIG. 4 illustrates an apparatus suitable for implementing the stereolithographic methods illustrated and described by the systems and flow charts of FIGS. 1–3.

Referring now more specifically to FIG. 2 of the drawings, the stereolithographic method is broadly outlined. Step 8 calls for generating of CAD or other data, typically in digital form, representing a three-dimensional object to be formed by the system. This CAD data usually defines surfaces in polygon format, triangles with normals perpendicular to the planes of those triangles, e.g., for slope indications, being presently preferred, and in a presently preferred embodiment of the invention conforms to the Programmer's Hierarchial Interactive Graphics System (PHIGS) now adapted as an ANSI standard. This standard is described, by way of example, in the publication "Understanding PHIGS", published by Template, Megatek Corp., San Diego, Calif. According to the teachings of this invention, this design data may be modified from either a physical or mental embodiment of a desired object design for the purpose of processing the data during the build process to achieve curl balancing and to produce the desired object.

In Step 9, the PHIGS data or its equivalent is converted, in accordance with the invention, by a unique conversion system to a modified data base for driving the stereolithography output system in forming three-dimensional objects. In this regard, information defining the object is specially processed to reduce stress, curl and distortion, and increase resolution, strength and accuracy of reproduction. In this step the regions requiring curl balancing are preferably determined and designated appropriately for proper handling when the material is transformed.

Step 10 in FIG. 2 calls for the generation of individual solid laminae representing cross-sections of a three-dimensional object to be formed. These generated solid lamina may differ, according to the present teaching, from the desired lamina of the three-dimensional object to achieve optimal curl balancing. Step 11 combines the successively formed adjacent laminae to form the desired three-dimensional object which has been programmed into the system for selective curing. Typically, steps 10 and 11 are simultaneously performed during layer formation.

Hence, the stereolithographic system of the present invention generates three-dimensional objects by creating a cross-sectional pattern of the object to be formed at a selected surface of a building material (e.g., an ultraviolet (UV), visible light, or infrared (IR) curable fluid-like material or the like) capable of altering its physical state in response to appropriate synergistic stimulation such as impinging radiation, electron beam or other particle bombardment, or applied chemicals such as by ink jet or spraying over a mask adjacent the fluid surface. Successive adjacent laminae, substantially representing corresponding successive adjacent cross-sections of the object except as modified according to the instant teachings, are automatically formed and integrated together to substantially provide a step-wise lamina or thin layer buildup of the object, whereby a three-dimensional object is formed and drawn from a substantially planar or sheetlike surface of the medium during the forming process.

The aforedescribed technique illustrated in FIG. 2 is more specifically outlined in the flow chart of FIG. 3 where again Step 8 calls for generation of CAD or other data, typically in digital form, representing a three-dimensional object to be formed by the system. Again, in Step 9, the PHIGS data is converted by a unique conversion system to a modified data base for driving the stereolithography output system in forming three-dimensional objects. Step 12 calls for containing a fluid-like medium capable of solidification in response to prescribed reactive stimulation. Step 13 calls for application of that stimulation as a graphic pattern, in response to data output from the computer 4 in FIG. 1, at a designated surface to form thin, solid, individual layers at that surface, each successive layer representing an adjacent cross-section of a three-dimensional object to be produced. In the practical application of the invention, each lamina will be a thin lamina, but thick enough to be adequately cohesive in forming the cross-section and adhering to the adjacent laminae defining other cross-sections of the object being formed. According to the instant teaching, transformation of portions of layers of material may deviate from a substantially uniform layer by layer buildup, as necessary, to insure adequate curl balancing and proper accuracy of the produced object.

Step 14 in FIG. 3 calls for superimposing successive adjacent layers or laminae on each other as they are formed, to integrate the various layers and define the desired three-dimensional object. In the normal practice of the invention, as the medium cures and solid material forms to define one lamina, that lamina is moved relatively away from the working surface of the medium and the next lamina is formed in the new layer of medium which replaces the previously formed lamina, so that each successive lamina is superimposed and integral with (by virtue of the adhesive properties of the cured medium) all of the other cross-sectional laminae.

The process of producing such cross-sectional laminae is repeated until the entire three-dimensional object has been formed. The object is then removed and the system is ready to produce another object which may be identical to the previous object or may be an entirely new object formed by changing the program or object data controlling the stereolithographic system.

"Stereolithography" is a method and apparatus for making solid objects by successively "printing" thin layers of a curable material (e.g., a UV or IR curable material) on top of one another. In one embodiment, a programmable movable beam of UV or IR light or other synergistic stimulation is directed onto a surface or layer of UV or IR curable material (e.g. a curable liquid, powder or other material) to form a layer of the object, from cross-sectional data, at the surface of the material. The object is then relatively moved, in a programmed manner, away from the medium (e.g. liquid) surface by the thickness of one layer and the next cross-section is then formed and adhered to the immediately preceding layer defining the object. This process is continued until the entire object is formed.

Essentially all types of object forms can be created with the techniques of the present invention. Complex forms are more easily created by using the functions of a computer to help generate the programmed commands and to then send the program signals to the stereolithographic object forming subsystem.

The data base of a CAD system can take several forms. One form, as previously indicated, consists of representing the surface of an object as a mesh of triangles (PHIGS). These triangles completely form the inner and outer surfaces of the object. This CAD representation also includes, explicitly or implicitly, a unit length normal vector for each triangle. The normal points away from the solid which the triangle is bounding. A processing means transforms such CAD data into the layer-by-layer vector data that is necessary for forming objects through stereolithography and preferably for determining which regions of each layer are used in the curl balancing method of reducing curl.

For stereolithography to successfully work, there must be sufficient adhesion from one layer to the next. For example, when the medium is a liquid plastic, solidified plastic from one layer must overlay solidified plastic cured when the previous layer was built. However, the layers must adhere without distorting the object. For example, adjacent layers must adhere to each other without a second layer inducing a first layer to curl due to shrinkage. This invention provides a general means of insuring that adjacent layers can be built to adhere to each other reliably, as well as providing a way to reduce or eliminate curling between layers and ultimate distortion in formed parts. Post cure distortion "creep" may also be reduced by the present invention due to higher levels of curing that accompany curl balancing.

A presently preferred embodiment of a new and improved stereolithographic system is shown in elevational cross-section in FIG. 4. A container 21 is filled with a UV curable liquid 22 or the like, to provide a designated working surface 23. A programmable source of ultraviolet light 26 or the like produces a spot of ultraviolet light 27 in the plane of surface 23. The spot 27 is movable across the surface 23 by the motion of mirrors or other optical or mechanical elements (not shown in FIG. 4) used with the light source 26. The position of the spot 27 on surface 23 is controlled by a computer control system 28. As previously indicated, the system 28 may be under control of CAD data produced by a generator 20 in a CAD design system or the like and directed in PHIGS format or its equivalent to a computerized conversion system 25 where information defining the object is specially processed to reduce stress, curl and distortion, and increase resolution, strength and accuracy of reproduction.

A movable elevator platform 29 inside container 21 can be moved up and down selectively, the position of the platform being controlled by the system 28. As the device operates, it produces a three-dimensional object 30 by step-wise buildup of integrated laminae such as 30a, 30b, 30c.

The surface of the UV curable liquid 22 is maintained at a constant level in the container 21, and the spot of UV light 27, or other suitable form of reactive stimulation, of sufficient intensity to cure the liquid and convert it to a solid material, is moved across the working surface 23 in a programmed manner. As the liquid 22 cures and solid material forms, the elevator platform 29 that was initially just below surface 23 is moved down from the surface in a programmed manner by any suitable actuator. In this way, the solid material that was initially formed is taken below surface 23 and new liquid 22 flows across the surface 23. A portion of this new liquid is, in turn, converted to solid material by the programmed UV light spot 27, and the new material adhesively connects to the material below it. This process is continued until the entire three-dimensional object 30 is formed. The object 30 is then removed from the container 21, and the apparatus is ready to produce another object. Another object can then be produced, or some new object can be made by changing the program or data in the computer 28.

The UV curable material used in the presently preferred embodiment of a working stereolithography system (e.g., FIG. 4) is XB5081 stereolithography resin, made by Ciba Geigy of Basal, Switzerland.

The light source 26 produces the spot 27 of UV light small enough to allow the desired object detail to be formed, and intense enough to cure the UV curable liquid being used quickly enough to be practical. The source 26 is arranged so it can be programmed to be turned off and on, and to move, such that the focused spot 27 moves across the surface 23 of the liquid 22. Thus, as the spot 27 moves, it cures the liquid 22 into a solid, and "draws" a solid pattern on the surface in much the same way a chart recorder or plotter uses a pen to draw a pattern on paper.

The light source 26 for the presently preferred embodiment of a stereolithography system is typically a helium-cadmium ultraviolet laser emitting 325 nM radiation such as the Model 4240-N HeCd Multimode Laser, made by Liconix of Sunnyvale, Calif.

In the system of FIG. 4, means may be provided to keep the surface 23 at a constant level and to replenish this material after an object has been removed, so that the focus spot 27 will remain sharply in focus on a fixed focus plane, thus insuring maximum resolution in forming a layer along the working surface.

The elevator platform 29 is used to support and hold the object 30 being formed, and to move it up and down as required. Typically, after a layer is formed, the object 30 is moved beyond the level of the next layer to allow the liquid 22 to flow into the momentary void at surface 23 left where the solid was formed, and then it is moved back to the correct level for the next layer. The requirements for the elevator platform 29 are that it can be moved in a programmed fashion at appropriate speeds, with adequate precision, and that it is powerful enough to handle the weight of the object 30 being formed. In addition, a manual fine adjustment of the elevator platform position is useful during the set-up phase and when the object is being removed.

A computer controlled pump (not shown) may be used to maintain a constant level of the liquid 22 at the working surface 23. Appropriate level detection system and feedback networks, well known in the art, can be used to drive a fluid pump or a liquid displacement device, such as a solid rod (not shown) which is moved out of the fluid medium as the elevator platform is moved further into the fluid medium to offset changes in fluid volume and maintain constant fluid level at the surface 23. Alternatively, the source 26 can be moved relative to the sensed level 23 and automatically maintain sharp focus at the working surface 23. All of these alternatives can be readily achieved by appropriate data operating in conjunction with the computer control system 28.

After the three-dimensional object 30 has been formed, the elevator platform 29 is raised and the object is removed from the platform for post processing. The present invention satisfies a long existing need in the art for a CAD and CAM system capable of rapidly, reliably, accurately and economically designing and fabricating three-dimensional plastic parts and the like, and reducing stress and curl.

Curling has generally been a problem in stereolithographic applications in the upward direction (upward curl) when transforming successive layers on top of one another. Upward curling is especially noticeable in downfacing regions of an object (features or areas of an object that overhang or extend away from the object, See FIGS. 7 and 8) being formed because the layer forming the downfacing feature has no means of resisting upward forces when successive layers are adhered above it unless supports are included in the forming process. However, curling is also possible in the transformation plane of a layer such as when two horizontal vectors cure overlapping regions of material. Normal curl refers to curl of a first cured element of material in a direction towards a second cured element of material cured in contact with the first cured element. Likewise, reverse curl is curl in the opposite direction relative to normal curl; therefore, in the direction away from the second cured element. For example, when adhering a second layer above and to a first lower layer, normal curl is in the upward direction while reverse curl will be in the downward direction. Although the present invention is primarily described in terms of normal curl being in the vertical upward direction and reverse curl being in the downward vertical direction the terms "normal curl" and "reverse curl" are just as applicable to, for example, horizontal curl in a right or left direction.

In order to understand the concept of curl balancing it is helpful to first consider the concepts of downward curl in multiple layers, reverse curl in a single layer and the cure depth at which significant reverse curl will occur in a single layer. The concept of downward curl is similar to the concept of upward curl except that curling is induced in a layer of building material (e.g. photopolymer) in the downward direction. Thus, downward curl is a distortion that occurs when a lower layer of photopolymer resin or other similar building material is solidified in contact with a previously solidified upper layer of material. As the lower layer of material is transformed from a flowable state to a cohesive or solid state it undergoes a change in density. This change in density is usually an increase in density causing shrinkage of the material. As the lower layer of material shrinks at a greater rate than the material in the upper layer and simultaneously adheres to the previously formed upper layer, it can induce sufficient stress in the upper layer to distort it downward. In addition, for an exothermic material, this distortion may be enhanced by an increase in temperature and associated expansion during formation of the layer and, resulting contraction after cooling and adhesion.

The concept of inducing downward curl in multiple layers is similar to inducing reverse curl in a single layer. Significant reverse curl can be achieved in a single layer of material by curing the layer (from top to bottom) to a deep enough depth of cure such that the rate of shrinkage near the top of a layer is smaller than that near the bottom. Initially, the shrinkage of material occurs either more rapidly near the top of the curing material or substantially at the same rate at the top and bottom of the curing material. As the cure depth of the layer increases, the rate of shrinkage of the layer begins to decrease near the top of the layer relative to the bottom of the layer. Eventually the layer will reach a thickness where the rate and extent of shrinkage near the bottom portion of the layer is substantially greater than the rate of shrinkage at the top portion of the layer thereby causing downward curl. For example, significant reverse curl will be achieved in a single layer of XB-5081 material, manufactured by Ciba Geigy of Basal, Switzerland at a cure depth of approximately 35 mils.

The cure depth at which significant reverse curl occurs in a single layer will vary depending upon the properties of the material being utilized. Reverse curl will occur when the rate of material shrinkage is occurring more rapidly at lower portions of a layer of transforming material than at higher portions of the layer such that the shrinking mass of material at the lower portions of the layer has sufficient modulus, as compared to that of the upper portions of the layer, to exert sufficient torque (stress) due to shrinking to cause a downward distortion (strain) of the layer.

Several important material properties can affect the cure depth at which significant reverse curl occurs. For example, when using a liquid photopolymer, that approximately absorbs synergistic stimulation according to Beer's Law, important properties to consider include, among others, the penetration depth of the material for a given type of synergistic stimulation, the extent of polymerization of a unit volume versus the exposure of that unit volume, the modulus of a unit volume for a given extent of polymerization, the density of a unit volume versus the extent of polymerization of that unit volume, and the like. The cure depth at which reverse curl will occur can be theoretically determined from an appropriately derived and weighted function of these variables.

A critical property, or variable, used in determining the cure depth at which significant reverse curl occurs in a single layer is the penetration depth of the material. The penetration depth of the material dictates the amount of differential exposure that occurs at different volume elements at different levels below the surface of the material. Each time one penetration depth is traversed into a material that obeys Beer's Law, the exposure at that level decreases by $1/e$ where e is a constant equal to 2.7183. The smaller the penetration depth the higher the degree of differential exposure in a given depth of material and therefore the higher the likelihood of having differential curing as well.

Since reverse curl is based on differential shrinkage of the transforming material between the upper portions and lower portions of a layer, the rate of curing must be different between these portions; or else the shrinkage for the same rate of curing at different levels of cure must be different. With currently preferred photopolymers, measurements have indicated that shrinkage occurs substantially linearly with the rate of transformation. However, it has also been observed that with some materials especially when close to the point of maximum transformation, shrinkage for a given change in transformation (e.g. polymerization or curing) decreases. Additionally and most importantly, it has been observed that the rate of transformation per unit of exposure decreases as higher and higher levels of transformation are achieved. Therefore, it can be assumed that reverse curl is due predominately to the difference between the rate of transformation for different levels of transformation for a given exposure, thereby, resulting in different rates of transformation and corresponding rates of shrinkage at different levels of a material.

The rate of transformation is based on several criteria including the absorption properties and chemical properties of the particular material being cured. However, the two most important properties for present considerations are the exposure incident on a given volume element and the level of transformation that has already occurred on the given volume element. As the volume element is exposed, it begins to transform. As the material approaches the point of complete transformation the rate of transformation begin to slow. Eventually, when the point of complete transformation is reached, the rate of transformation will stop. Therefore, it is possible to have a faster rate of transformation in a unit volume that is receiving less exposure than in a unit volume that is receiving a much greater exposure but is closer to complete transformation. The same situation can occur when forming a layer from a material that obeys Beer's Law. As the upper portion of the layer approaches the point of complete transformation its transformation proceeds at a slower rate than the lower portion of the layer which remains relatively untransformed and therefore can have a higher rate of transformation. Therefore, in general, the smaller the penetration depth of a layer the thinner the cure depth necessary to begin to see the effects of reverse curl. Knowing the cure depth at which reverse curl begins to occur permits the selection of a layer thickness or, more specifically, a building layer thickness to use in building an object using the curl balancing technique. Generally, in standard applications, the building layer thickness remains constant for all the layers of the object being formed.

In the following discussion reference to a layer (e.g. balanced layer, core layer or balancing layer) or multiple layers and the like may refer to either an entire layer or merely a portion of a layer. Since curl balancing is generally applied to the layers above a down-facing feature and since down-facing features may only encompass portions of a layer, only portions of layers need participate in a curl balancing technique.

The concept of curl balancing involves a relationship between a first layer (or group of layers) which acts as a balanced or core layer (e.g. a layer being curl balanced by another layer) with a second layer (or group of layers) which acts as a balancing layer (e.g. a layer that is balancing curl in another layer). The balancing layer induces upward and downward curl in the core layer in such a way that it eliminates or substantially reduces the final or net curl between the two layers. Although the balanced layer and balancing layer may not necessarily be formed using the building layer thickness the combination of their cure depths will result in a desired net cure depth or net thickness that may be a multiple of the building layer thickness (e.g. two building layers thick, three building layers thick and so forth). In addition to the balanced and balancing layers there are associated curl balancing parameters. Thus, the curl balancing parameters including the cure depth, layer thickness and exposure utilized with a given balanced layer are known as the balanced cure depth, balanced layer thickness and the balanced exposure, respectively, and those utilized with a given balancing layer are known as the balancing cure depth, balancing layer thickness and balancing exposure.

When two layers are being curl balanced together the embodiment is referred to as a two layer embodiment and the desired net cure thickness resulting from the combination of exposing the balancing and balanced layer are two layer thicknesses. When three layers are being balanced the embodiment is referred to as a three layer embodiment and the desired net cure thickness resulting from the combination of exposing the balancing and balancing layers are three layer thicknesses. Likewise, the concept is the same when we consider any higher order multilayer embodiment. However, when curl balancing a multilayer embodiment a number of combinations are typically available for selecting a desired net thickness. For example, in a six layer embodiment it may be desireable to first balance two layers (e.g. the second and third layers) as a two layer embodiment having a desired net thickness of approximately two layers such that the lower surface of transformed material is above the desired lower level of the material to be transformed when processing of the six layers is complete. Subsequently, using the approximate two layer thickness as a balanced layer and the remaining layers as the balancing layer, the six layers may be cured to obtain a final desired net thickness of six layers and the desired placement of the lowest and highest transformed surfaces. The number of combinations available for a given embodiment will become evident upon review of the examples discussed herein.

The presently preferred material, XB 5081, has a penetration depth of approximately 7 mils (0.007 inches) and exhibits the onset of reverse curl at approximately 35 mils. This cure depth for reaching the onset of reverse curl makes this material useful for a two layer embodiment of curl balancing wherein the building layer thickness is approximately 20 mils. For example, this building layer thickness permits a first layer to be formed as a balanced layer (e.g. —which may have a balanced cure depth of 15 mils instead of the 20 mil building layer thickness wherein transformation occurs from an upper level of the layer) and the successive layer to be cured as a balancing layer (e.g. —which may have a balancing cure depth of 40 mils instead of the 20 mil building layer thickness wherein transformation begins from an upper level which is 20 mils above the upper level of the previous layer) to form a net cure thickness equal to a two layer thickness of 40 mils. Assuming the balanced and balancing layer thicknesses suggested in parenthesis are valid the two layers should be balanced to eliminate or substantially reduce the amount of curling that would result if the two layers were merely formed as two successive 20 mil layers (including a minimal overcure associated with the second layer to assure adhesion).

In contrast, the presently preferred material (having a penetration depth of 7 mils) would not be a satisfactory material for curl balancing with a two layer embodiment when using a building layer thickness of 5 mils. If a two layer embodiment of curl balancing were desired with 5 mil layers, it would be beneficial to use a material having a penetration depth of 1–3 mils.

Although the curl balancing concepts are similar for any multilayer embodiment the present invention will be initially addressed in terms of a two layer curl balancing embodiment. In considering a curl balancing embodiment, the cure depths or exposures of each layer must be selected appropriately to accomplish two goals including: 1) balancing the curl in a two layer combination and 2) transforming the desired net cure thickness as measured from the upper surface of the upper layer. Curl balancing is achieved by curing the balancing layer deep enough into the balanced layer or beyond the lower level of cure of the balanced layer so that upward and downward curl are balanced and net curl is eliminated or substantially reduced.

Also, it should be noted that as the balancing cure depth is increased, the width of the balancing layer becomes wider and will tend to distort the shape of the final object. Therefore, the cure width of the balancing and other layers must be adjusted through a cure width compensation means several of which are known in the art and disclosed in previously referenced applications such as U.S. patent application Ser. No. 07/606,191, filed by Snead et al., entitled "Boolean Layer Comparison Slice."

The net cure depth thickness is achieved using one of three methods: 1) if the balancing cure depth of the balancing layer extends beyond the lower limit of the balanced cure depth of the balanced layer, the balancing cure depth and therefore its exposure is used to achieve the net cure thickness; 2) if the net cure thickness is substantially achieved due to the combined exposures of the balancing and balanced layers, then the combination of exposures must be considered in achieving the desired cure depth as well as achieving curl balancing; and 3) if the net cure thickness is substantially determined by the balanced cure depth of the balanced layer then the exposure of the balanced layer must be selected to give substantially a cure depth of one layer thickness. As a case 1 example, if one is building with a material that obeys Beer's Law and significant single layer reverse curl sets in with cure depths somewhat less than two layer thicknesses, it may be desireable plan to cure the balancing layer to a depth of a two layer thickness and to select a cure depth for the balanced layer at something less than a one layer thickness so that the downward curl balances the upward curl. In any of the three cases, it may be necessary to utilize theory to predict the desired exposures, iterative processes based on a selection of initial exposures to determine whether the process eventually converges to yield exposures that achieve curl balancing and the desired cure thicknesses, or experimental techniques for determining the necessary exposures that achieve the desired goal.

For given material and layer thickness combinations and object geometries that have a thickness greater than two layers, curl balancing using a two layer embodiment may be inappropriate and a multilayer embodiment having N layers (where N is greater than two) may prove more suitable. For a two layer embodiment of curl balancing to be effective any additional layers adhered to the two layers must not induce significant curl in the two layers. If a relatively weak material is used, curl balancing may be achieved with two layers but a third or other higher level layer may reintroduce upward curl in the combined layers. In a multilayer embodiment, curl balancing may be achieved by exposing the material from two different levels of the object although the requirement of a two layer net cure thickness would be replaced by a N-layer net cure thickness; or in a multilayer embodiment, the curl balancing and desired net cure thickness can be achieved by exposing the material at more than two levels of the object.

For object geometries that are only two layers thick and for which no appropriate exposure combinations can be found to achieve curl balancing, it is desirable to do some special processing of the two layer thick region. When curl balancing using a two layer embodiment cannot be achieved for object geometries that are only two layers thick, it is reasonable to assume that the material is capable of forming a single layer of material equal to a two layer thickness without the onset of significant reverse curl. That is, the two layers are treated as a single layer and synergistic stimulation is applied to expose both layers of the region from the upper surface of the higher of the two layers such that the resulting cure depth is equivalent to two layer thicknesses. In other words, the balanced layer is omitted (e.g., has a zero balanced cure depth) and the balancing layer is cured to form a desired net thickness of two layer thicknesses.

In further considering case 1 above, an upper portion of the balancing layer forms above the core layer inducing upward curl of the core layer; and, a lower portion of the balancing layer forms below the core layer inducing downward curl of the core layer. Curl balancing occurs when the upward and downward curl of the core layer balances out to a point where curl is substantially reduced or eliminated. This concept is best explained in reference to the models illustrated in FIGS. 5 and 5A.

Figure 5:
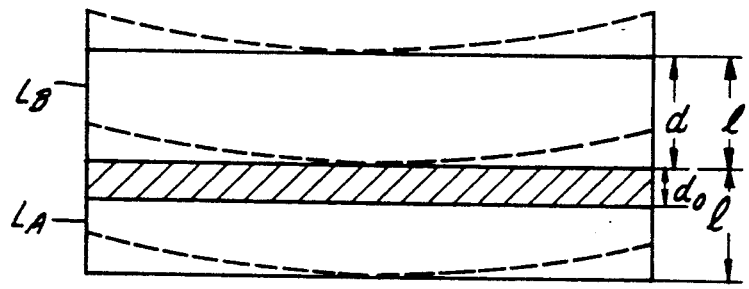
FIG. 5 illustrates a side view of two adjacent layers formed using standard stereolithographic techniques.

FIG. 5 illustrates a model of two stereolithographically formed layers of an object. The first layer is supported by an appropriate means (not shown). The two layers are successively cured to each other such that a first layer $L_A$ having a building layer thickness 1 adheres to a second layer $L_B$ also having a building layer thickness 1. That is, after the first layer $L_A$ is cured the SLA lowers the elevator platform a distance equal to a layer thickness 1 and the second layer $L_B$ is cured to a cure depth d which includes an overcure $d_o$ to insure adhesion to the first layer $L_A$. As indicated by the dotted line, the first layer $L_A$ will curl upward as the second layer $L_B$ shrinks. Using the curl balancing concept the two layers in FIG. 5 can be cured in relation to each other such that the distortion caused by curling is substantially reduced or eliminated as illustrated in FIG. 5A.

Figure 5A:
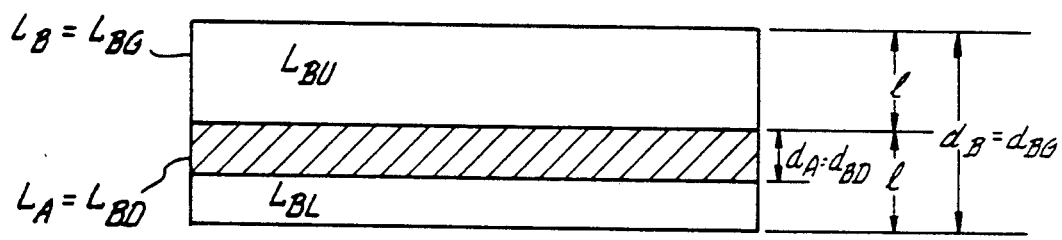
FIG. 5A illustrates a side view of a balanced layer and a balancing layer stereolithographically formed using a curl balancing technique.

Turning in detail to FIG. 5A, a second model of two stereolithographically formed layers of the same object as in FIG. 5 is illustrated except that the object in FIG. 5A is formed using curl balancing. The building layer thicknesses in FIG. 5A are also equal to 1. The first layer $L_A$ is selected as the balanced layer $L_{BD}$ and the second layer is selected as the balancing layer $L_{BG}$. A cured portion of the first layer $L_A$ is cured to a cure depth $d_A$ which is also the balanced cure depth $d_{BD}$. After the first layer $L_A$ is cured to a cure depth $d_{BD}$ (e.g. where $d_{BD}<1$) the second layer $L_B$ is cured to a cure depth $d_B$ which is the balancing cure depth $d_{BG}$ to form a layer thickness equal to 2l (i.e. where $d_{BG}>1$). In other words, the second layer $L_B$ (balancing layer $L_{BG}$) overcures the entire first layer $L_A$ (balanced layer $L_{BD}$) such that upward curl of the first layer $L_A$ caused by the second layer $L_B$ is substantially negated by downward curl of $L_A$ caused by $L_B$. Thus, the second layer $L_B$ is comprised of an upper region $L_{Bu}$ above the previously cured portion of the first layer $L_A$ and a lower region $L_{BL}$ below the previously cured portion of the first layer $L_A$. As the upper region $L_{Bu}$ shrinks and adheres in relation to the first layer $L_A$ it tends to create an upward torque on the first layer $L_A$ inducing upward curl thereon. Similarly, as the lower region $L_{BL}$ shrinks and adheres in relation to the cured portion of the first layer $L_A$ it tends to create a downward torque on the cured portion of the first layer $L_A$ inducing downward curl thereon. By balancing or playing the upward torque and downward torque on this cured portion of the first layer $L_A$ against each other the net curl of the layers can be substantially reduced or eliminated.

This description applies to a case 1 situation. Therefore, the balanced exposure and balanced cure depth of the balanced layer are specified so as to be balanced by the balancing layer which is given an appropriate balancing exposure to cause a net cure depth equal to a two layer thickness. In this case, a material that obeys or approximates Beer's Law is used. The appropriate balancing exposure is substantially that required to achieve a balancing cure depth of two layer thicknesses regardless of whether there was a previously cured region $L_A$. In a case 2 situation, a partially bleaching material is used. The appropriate balancing exposure of the balancing layer $L_B$ has to take into account the previously exposed region $L_A$ due to the change in absorption properties of the material due to the previous exposure.

As described earlier, the value or magnitude of the curl balancing parameters needed for curing a balanced layer $L_{BD}$ in relation to a balancing layer $L_{BG}$ are determined primarily by the material properties of the photopolymer being used, the synergistic stimulation, and the layer thickness. For a photopolymer material and synergistic stimulation combination, a number of acceptable building layer thicknesses can be utilized. A range of these layer thicknesses can be utilized in the curl balancing process and for each building layer thickness 1 in each material there is a range of values for the curl balancing parameters that can be utilized to substantially reduce or eliminate curling. This range of values and appropriate exposure parameters are designated as the optimum curl balancing parameters and are stored in the controlling computer of the SLA for each photopolymer material utilized by the SLA.

The optimum curl balancing parameters can be determined both empirically or theoretically and involve knowledge relating to the range of cure depths or single thicknesses of a single layer of a photopolymer wherein significant reverse curl begins to occur.

To empirically determine optimum curl balancing parameters a series of test parts may be formed using predetermined or given parameters including the balanced layer thickness $l_{BD}$, balancing layer thickness $l_{BG}$, and balanced cure depth $d_{BD}$. Test parts are then built with varying balancing cure depths $d_{BG}$ (e.g., balancing cure depths equal to $l_{BG} \ldots 1.5l_{BG} \ldots 2l_{BG}$) applied to each test part. For example, for a building layer thickness 1, a first balanced layer $L_{BD1}$ is cured to a support having a specified or predetermined balanced layer thickness $l_{BD1}$ having a specified or predetermined balanced cure depth $d_{BD1}$. A specified or predetermined balancing layer $L_{BG}$ having a balancing layer thickness $l_{BG}$ is then cured and adhered to the first balanced layer $L_{BD}$ using a balancing cure depth $d_{BG1}$ which is the first of a range of balancing cure depths $d_{BG(x)}$. Similarly, additional series of test parts may successively be formed using the different predetermined values $l_{BD}$, $d_{BD}$, and $l_{BG}$ while progressively or incrementally changing the balancing cure depth $d_{BG}(x \ldots x_n)$. Eventually, from the range of balancing cure depths $d_{BG}(x_1 \ldots x_n)$ for the various values $l_{BD}$, $d_{BD}$ and $l_{BG}$ one can extract the optimum range of balancing cure depths for achieving optimum curl balancing results for the various values $l_{BD}$, $d_{BD}$ and $l_{BG}$. If desired balancing layer thickness $l_{BG}$ and balanced layer thickness $l_{BD}$ are known (for example, both being 5 mils or both being 20 mils or one being 10 mils and the other being 5 mils) then one must only vary the balancing cure depth and balanced cure depth, by varying the balancing exposure and balanced exposure respectively, and determine the appropriate values that yield the proper net cure thickness and that demonstrate adequate reduction in curl. These appropriate cure parameters (i.e. depth relationships or exposure relationships) can then be applied during the building process to the appropriately determined layers or portions of layers of a part that is being built by the techniques of stereolithography. These regions can be determined by a SLICE type program or the like as disclosed in U.S. patent application Ser. No. 331,644 or U.S. patent application Ser. No. 07/606,191 entitled "Boolean Layer Comparison Slice". If not already done, a similar approach may be used for determining other curl balancing parameters. The procedure will be similar except that other curl balancing parameters will be extracted from the data.

The cure depths for curl balancing can also be theoretically determined based on known material properties such as critical exposure, penetration depth, extent of polymerization versus exposure, shrinkage versus extent of polymerization, modulus versus shrinkage or polymerization, and extent of polymerization of the balanced layer.

Figure 7:
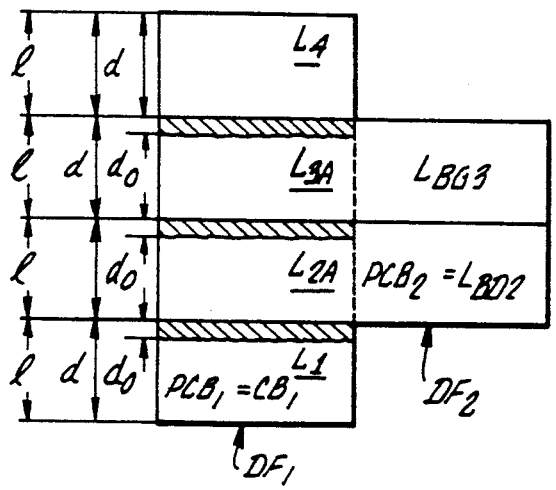
FIG. 7 illustrates a front view of the three-dimensional object shown in FIG. 6.
Figure 6:
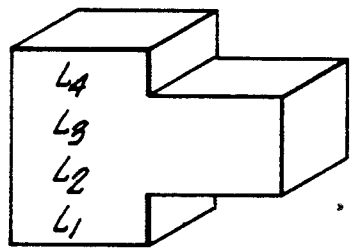
FIG. 6 illustrates a three dimensional object formed using a curl balancing technique.
Figure 2A:
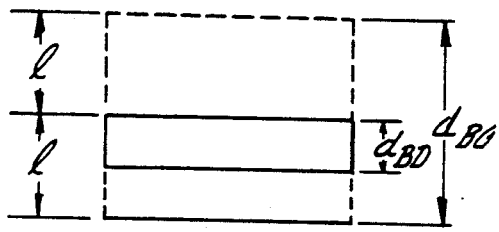
Figure 2B:
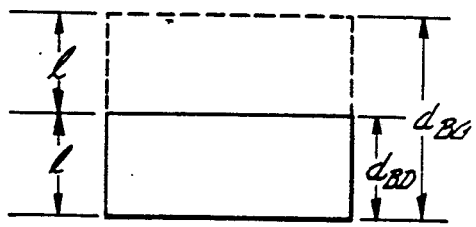
Figure 2C:
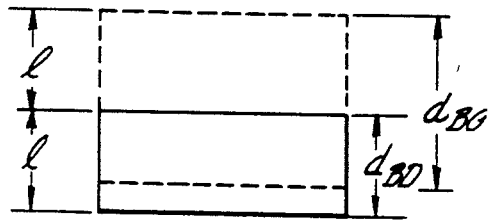
Figure 2D:
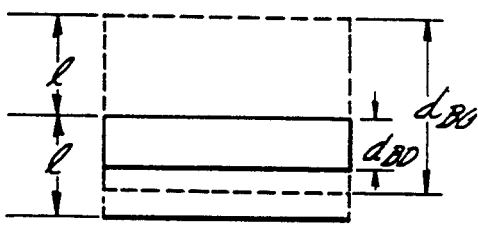

Turning in detail to FIG. 6, an object is shown which is to undergo stereolithographic building utilizing the curl balancing method and apparatus. For simplicity and as illustrated in FIG. 7, the object is comprised of four layers $L_1$, $L_2$, $L_3$ and $L_4$ having a fixed building layer thickness 1.

Each layer is comprised of a surface that faces upward and a surface that faces downward. If the lower surface, or portion of the lower surface of a layer is not bounded from below by another adjacent layer then it is defined as a downfacing region DF. For example, in FIG. 7, the first layer $L_1$ has a downfacing region $DF_1$ because it is not adhered to any layer below it (except for a support structure not shown). Similarly, the second layer $L_2$ is comprised of a downfacing region $DF_2$ which extends out past the first layer $L_1$ and, therefore, is not bounded by a lower layer.

Once each of the downfacing surfaces or regions is identified, these downfacing regions on their respective layers are selected as potential curl balance layers PCB. As illustrated in FIG. 7, there are two downfacing regions in the object including downfacing region $DF_1$ including the entire first layer $L_1$ and downfacing region $DF_2$ including the portions of the second layer $L_2$ overhanging the first layer $L_1$.

Once the downfacing layers or regions have been identified and categorized as potential curl balance layers PCB (e.g. $DF_1$: $PCB_1$, and $DF_2$: $PCB_2$) they are further categorized to determine which downfacing regions have a second layer above them. These downfacing regions are then designated curl balanced layers or regions $L_{BD}$. Thus, downfacing region $DF_2$ is selected as a curl balanced region $L_{BD2}$. The portion of the third layer $L_3$ above the curl balanced region $L_{BD2}$ is designated as a curl balancing layer or region $L_{BG3}$.

Since downfacing region $DF_1$ is the first layer $L_1$ of an object it will be cured to a support and it may not be necessary to designate it as a curl balanced region. Since the support is secured to the elevator platform (not shown) this layer can adequately resist curling so that curl balancing will generally not be necessary. However, if curl balancing is desired on this layer, the layer may be treated as a curl balanced layer LBD (not shown) and the portion of layer 2 above the $LBD_1$ (not shown) would be treated as a curl balancing region material to a $L_{BG2}$ (not shown).

Supports are required when building objects using stereolithography for several reasons. First, as with the first layer $L_1$, supports are necessary to attach or secure the base of an object being built to the elevator platform. Second, supports may be built to attach or secure any unsupported or downfacing areas of an object such as downfacing region $DF_2$ being built to protect that area of the object from damage that may occur during the part building process. For example, the objects may undergo a significant amount of upward and downward motion relative to the building material during the coating process. Therefore, the object and, most notably the downfacing region $DF_2$, will be subjected to forces that are capable of breaking, bending, distorting, or simply misplacing unsupported areas of the object unless they are properly secured. Third, supports are required to restrain or rigidly support regions of an object that are likely to distort due to curl. Each of the three situations mentioned requires a substantial amount of support. However, the third situation is especially significant and often requires much more design consideration than other supports. The first two situations can be generally and adequately handled by roughly placed generic supports. However, for example, the corners of an object are prime targets for curl and, therefore, typically require specifically placed supports to prevent them from distorting. However, the location and orientation of the corners are object dependent making the design of the supports difficult. As a result, the design of supports to restrain areas such as corners likely to curl is a time consuming process. Through the method and apparatus of the present invention, curl is reduced thereby reducing the need for supports. Thus, the file sizes required, CAD design time and part building time are also reduced.

Once the various layers and regions have been identified or categorized the three-dimensional object in FIG. 7 is built layer by layer using standard stereolithographic exposures except in the regions designated as the curl balanced layer region $L_{BD2}$ and the curl balancing layer region $L_{BG3}$. The new exposures associated with the curl balanced layer region $L_{BD2}$ and curl balancing layer region $L_{BG3}$ are predetermined based upon previously stored information of optimal curl balancing parameters as well as other information pertaining to the material being used in connection with the given building layer thicknesses $l_{BG}$ and $l_{BD}$.

When building the object in FIG. 7, a support for the object is formed attached to the elevator platform. The layers $L_1$, $L_2$, $L_3$ and $L_4$ are then successively formed adhering through each other to the support. Each layer is then cured to a building layer thickness 1, or a building layer thickness plus a desired over cure, according to standard stereolithographic procedures unless the region being cured has been designated for curl balancing. Generally, the wavelength applied to each layer remains constant throughout the process of curing the layers whether for a standard layer or a layer designated for curl balancing and the exposure is varied in order to achieve the various cure depths.

However, wavelengths of radiation may be utilized advantageously when applied to curl balancing. For example, multiple wavelengths can be applied to achieve multiple or variable penetration depths in a single material to transform different building layer thicknesses. Similarly, variable wavelengths of radiation may be utilized for transforming the curl balancing layer and the balanced layer. That is, it may be advantageous to use two different wavelengths including one having a shorter penetration depth to transform the balanced layer and a second having a longer penetration depth to transform the balancing layer.

Assuming in FIG. 7 that the wavelength remains constant, the first layer $L_1$ is cured to a depth d equal to the layer thickness 1. Although not preferred, but commonly done, it may also be given an overcure depth sufficient to adhere the first layer $L_1$ to the elevator platform supports. The preferred approach is to give the first layer $L_1$ a layer thickness cure depth and to insure adhesion to the supports by building at least one additional layer of supports (including an overcure) in association with at least the first layer. The elevator platform is then relatively lowered a net incremental distance equal to the layer thickness 1 to permit the second layer $L_2$ to be coated and cured.

The second layer $L_2$ is broken down into two regions that require different exposures including a first region $L_{2A}$ and a second region designated the curl balanced layer region $L_{BD2}$. Therefore, the second layer $L_2$ is cured using a standard stereolithographic cure depth and exposure for the first region $L_{2A}$ and a balanced layer exposure and balanced cure depth $d_{BD}$ for the balanced layer region $L_{BD2}$. Therefore, the first region $L_{2A}$ of the second layer $L_2$ is cured to a depth d equal to the layer thickness $l_{BD}$ (where $l_{BD}=1$) plus an overcure depth $d_o$ sufficient to adhere the second layer $L_2$ to the first layer $L_1$. However, when the synergistic stimulation cures the curl balanced layer region $L_{BD2}$ the exposure changes from an exposure calculated to transform material to a cure depth d to a balanced exposure calculated to transform material to a balanced cure depth $d_{BD}$ which may be less than or equal to the layer thickness 1. Several examples of the various combinations of balanced cure depths $d_{BD}$ and balancing cure depths $d_{BG}$ are shown in FIGS. 7A-7D. It should be noted that the curl balanced layer region $L_{BD2}$ can be supported by webs or the like. The curl balanced layer region $L_{BD2}$ is less susceptible to curl but it may be relatively weak due to a possible shallow cure depth. Therefore, a generic support structure might be helpful.

The third layer $L_3$ is also broken down into two regions including a first standard region $L_{3A}$ and a second region which is designated the curl balancing layer region $L_{BG3}$. The first region $L_{3A}$ is cured as a standard layer having a layer thickness $l_{BG}$ (where $l_{BG}=1$) and a cure depth d equal to the layer thickness $l_{BG}$ plus an appropriate overcure depth $d_o$ (if necessary) to adhere the first region $L_{3A}$ to the second layer $L_2$. When the laser or the like cures the curl balancing layer region $L_{BG3}$ the exposure changes to an appropriate exposure to increase the cure depth d to a balancing cure depth $d_{BG}$ which, as shown in the examples of FIGS. 7A-7D, may be less than or equal to the thickness of the third layer $L_3$ plus the second layer $L_2$ ($d_{BG} \leq 21$). It is, however, more than the exposure which was used for merely adhesion purposes on $L_{3A}$.

Turning in detail to FIGS. 7A-7D, one of a variety of different balancing cure depths and balanced cure depths may be required and will depend upon the properties of the material and the building layer thickness being utilized. In FIG. 7A, curl balancing is achieved using a balanced cure depth $d_{BD}$ less than the building layer thickness 1 and a balancing cure depth $d_{BG}$ equal to the balancing layer thickness $l_{BG}$ plus the balanced layer thickness $l_{BD}$ which is twice the fixed building layer thickness ($d_{BG}=l_{BG}+l_{BD}=21$).

In FIG. 7B, curl balancing is achieved using a balanced cure depth $d_{BD}$ equal the layer thickness 1 and a balancing cure depth $d_{BG}$ equal to twice the building layer thickness 21.

In FIG. 7C, curl balancing is achieved using a balanced cure depth $d_{BD}$ equal to the layer thickness 1 and a balancing cure depth $d_{BG}$ greater than one building layer thickness 1 plus a standard adhesion overcure thickness $d_o$ or ($1+d_o$) for the given material but less than twice the building layer thickness 21.

In FIG. 7D, curl balancing is achieved using a balanced cure depth $d_{BD}$ less than one building layer thickness 1 and a balancing cure depth $d_{BG}$ greater than one layer thickness 1 but less than twice the building layer thickness 21 wherein the combined exposures result in a net cure thickness equal to 21.

Finally, the fourth layer $L_4$ is cured as a standard layer to a cure depth d equal to a layer thickness 1 plus a sufficient overcure $d_o$ to adhere the fourth layer $L_4$ to the third layer $L_3$.

Figure 8:
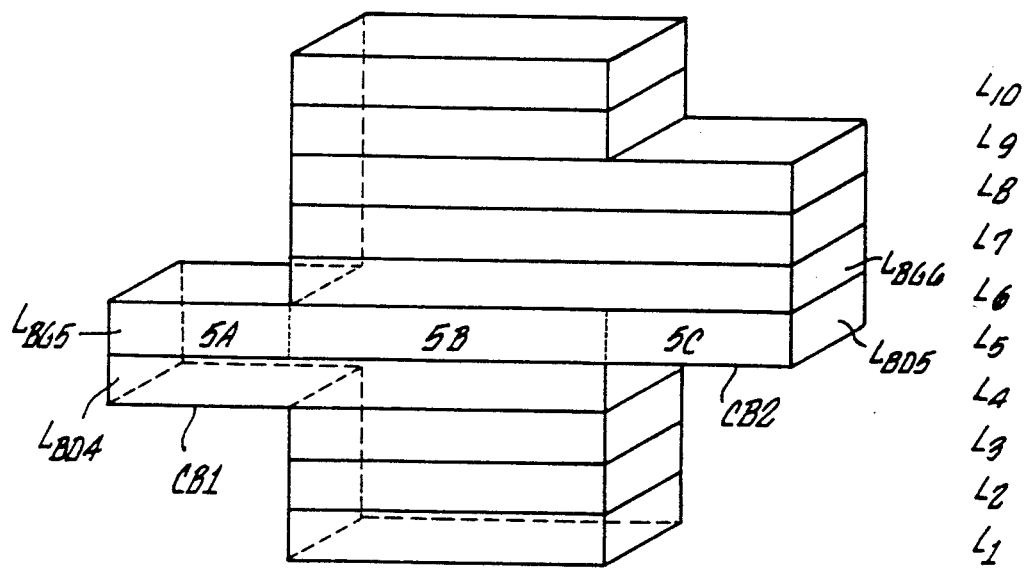
FIG. 8 illustrates an object having a layer that has a balanced layer portion, a balancing layer portion, and a standard formation portion.

It should be noted that depending on the complexity of a three-dimensional object there can be many curl balancing regions with respective balancing and balanced layers. In addition, different portions of the same layer or cross-section of an object can serve as both balancing layers and as balanced layers. A simple example is illustrated in FIG. 8 which shows a three-dimensional figure or object broken down into ten cross-sections or layers $L_1$-$L_{10}$. There are two curl balancing regions $CB_1$ and $CB_2$. The first curl balancing region $CB_1$, has a balanced layer $L_{BD4}$ on a portion of layer $L_4$ and a balancing layer $L_{BG5}$ on a portion $5_A$ of layer $L_5$. The second curl balancing region $CB_2$ has a balanced layer $L_{BD5}$ on a portion $5_C$ of layer $L_5$ and a balancing layer $L_{BG6}$ on a portion of layer $L_6$. Thus, the fifth layer $L_5$ has a portion $5_A$ which serves as a balancing layer, a portion $5_B$ which serves as a standard layer and a portion $5_C$ which serves as a balanced layer.

A second embodiment of the present invention permits curl balancing of three or more layers at one time. Although applicable to any layer thickness, this embodiment is especially useful when the building layer thickness 1 being utilized is relatively thin. This advantage stems from the fact that thin layers are usually relatively weak; and additionally from the situation wherein the material and synergistic stimulation is inappropriately combined to achieve curl balancing in association with a two layer embodiment. Even if the two layer embodiment can be implemented, some balanced layers may still have a combined strength which is relatively weak and therefore subject to curl when a third or higher layer is transformed above them using standard techniques. Therefore, it is more appropriate to apply a curl balancing technique which will result in a net structure which is more than two layers thick and will resist any distorting stresses which arise from subsequent standard applications of additional layers.

Turning in detail to FIG. 9, an object is illustrated having seven layers $L_1$-$L_7$ including a curl balancing region generally designated CB. The curl balancing region CB is a multilayer structure or, more specifically, a three layer structure which will be transformed according to a three layer curl balancing embodiment. This embodiment is shown in FIGS. 9A and 9B which illustrate sample methods of transforming a three layer embodiment to achieve curl balancing. Since the method for building standard layers and regions has been addressed the three layer embodiment discussion is limited to the curl balancing region CB. For simplicity, the portions of layers three through five $L_3$-$L_5$ illustrated in the curl balancing region CB will be treated as complete layers.

There are several methods for curl balancing a three layer embodiment all of which require identifying the respective balancing and balanced layers and their associated cure depths and exposures. As illustrated in FIG. 9A, if a two layer embodiment would be strong enough to resist curl, a simple solution for curl balancing the three layer region CB would be to curl balance the third layer $L_3$ with the fourth layer $L_4$ using any of the methods described in the first embodiment (e.g. —using a two layer embodiment) and then cure the fifth layer $L_5$ on top of the fourth layer $L_4$ (or balancing layer $L_{BG4}$) to a standard cure depth $d_5$ with a sufficient overcure $d_o$ to adhere the fifth layer $L_5$.

Another approach, illustrated in FIG. 9B, would involve bypassing any initial transformation of the third layer $L_3$ and treating the fourth layer $L_4$ as the curl balanced layer and giving it a cure depth of $d_{BD4}$ (where $d_{BD4} \leq 21$) and treating the fifth layer $L_5$ as the curl balancing region and giving it a cure depth of $d_{BG5}$ where $D_{BG5}=31$). Alternatively, as opposed to transforming a curl balanced or curl balancing portion of the third and fourth layers $L_3$ and $L_4$, both these layers can be bypassed and the fifth layer $L_5$ can be cured as a single layer to a cure depth equal to a three-layer thickness (not shown).

Referring to FIG. 9C, another alternative depending on the given curl balancing parameters is to curl balance region CB applying the curl balancing technique to all three layers. Thus, the third layer $L_3$ is initially designated the balanced layer $L_{BD3}$ having a balanced cure depth $d_{BD3}$ and is cured in relation to the fourth layer $L_4$ which is initially designated the balancing layer $L_{BG4}$ having a balancing cure depth $d_{BG4}$. Depending on the circumstances the two layers may be substantially curl balanced but have a net cure depth that does not match the desired cure depth. This combined layer will now be curl balanced by exposure of the fifth layer $L_5$ and is therefore designated as a balanced layer $L(L_{BG4} L_{BD3})_{BD}$. The fifth layer $L_5$ is therefore designated as a balancing layer $L_{BG5}$ and cured to a balancing depth $d_{BG5}$ (e.g. equal to three layer thicknesses) in relation to the curl balanced layer $L(L_{BG4} L_{BD3})_{BD}$ such that the three layers are now curl balanced.

A third embodiment is shown in FIG. 10 which illustrates an object similar to the object shown in FIGS. 7 and 9 except that it is divided into sixteen layers. The initial considerations for identifying the various regions are the same as described for FIGS. 7 and 9. Thus, the seventh layer $L_7$ will have a downfacing surface $DF_7$. Since there are six layers including the seventh through twelfth layers $L_7$–$L_{12}$ above the downfacing region $DF_7$ a variety of curl balancing embodiments are possible. In this example a four layer embodiment of curl balancing is being used.

Curl balancing four layers requires defining the curl balanced layer $L_{BD}$ and the curl balancing layer $L_{BG}$. Of course, as illustrated in the earlier embodiments, the greater the number of layers involved in a multilayer curl balancing embodiment, the greater the number of curl balancing options that are available. Since the procedure for curl balancing is the same for all embodiments (aside from determining the balanced layers and balancing layers) a number of these variations will merely be identified for the four layer embodiment to illustrate the various combinations.

The first obvious curl balancing variation would be to utilize an embodiment having fewer than four layers if the curl balanced layers are strong enough to resist curl when another layer is successively applied. For example, if a three-layer embodiment produces a strong enough structure to resist curl when a fourth layer is transformed (using standard techniques) above and to the previously transformed three-layer thickness of material then any of the techniques discussed with respect to FIG. 9 would become viable curl balancing methods for the object in FIG. 10. That is, layers $L_7$ through $L_9$ can be curl balanced using one of the variations for curl balancing a three-layer embodiment and then the tenth layer $L_{10}$ can be transformed to the ninth layer $L_9$. Similarly, a two-layer embodiment curl balancing technique can be applied, if adequate, to balance the seventh layer $L_7$ with the eighth layer $L_8$ and then, use standard techniques to transform the ninth layer $L_9$ and the tenth layer $L_{10}$. Other approaches exist as well which utilize a combination of curl balancing and other curl reduction techniques.

Specifically addressing the four-layer embodiment, the ninth layer can be designated the balanced layer $L_{BD9}$ and cured anywhere from a balanced cure depth $d_{BD9}$ of less than 1 up to 31 (e.g. $0 < d_{BD9} \leq 31$). The layer $L_{10}$ will then be the balancing layer $L_{BG10}$ having a balancing cure depth $d_{BG10}$ which might range from a value greater than 21 up to 41 (e.g., $21 < d_{BG10} \leq 41$) depending, of course, on the curl balancing parameters as discussed above. Using these guidelines, the various layers would be identified and input into the SLA and transformation would begin.

The first portions (non-curl balancing portions) of the seventh through ninth layers $L_7$–$L_9$ are successively cured using standard stereolithographic procedures and parameters. In terms of a scanning laser, the overhanging or downfacing regions of layer seven and the overlapping region of layer eight are not addressed until the laser reaches layer nine $L_9$. In other words, in this approach the downfacing portion of layer seven $L_7$ as well as the portion of layer eight $L_8$ above the down-facing portion of layer seven $L_7$ will not be transformed in association with transformation of the non-curl balancing portions of layers seven or eight which are cured using standard exposures. Initially, the first portion of the ninth layer $L_9$ is cured using a standard exposure. The exposure then changes to a balanced exposure to cure the balanced layer $L_{BD9}$ to a balanced cure depth $d_{BD9}$. The laser will then cure the first portions (non-curl balancing portions of the tenth layer using standard stereolithographic exposures until it reaches the beginning of the balancing layer $L_{BG10}$. The laser then changes to a curl balancing exposure to cure a balancing layer $L_{BG10}$ to a balancing cure depth $d_{BG10}$ to obtain a balancing cure depth $d_{BG10}$ which for this example, in the tradition of FIG. 7, is equal to the combined layer thickness of layers seven through ten (i.e. $l_7 + l_8 + l_9 + l_{10} = 41$). The remaining layers are then cured using standard stereolithograhic procedures or curl balancing procedures as needed until the object is completely built. This assumes, of course, that the four layer embodiment is strong enough to resist curl caused by the eleventh and twelfth layers $L_{11}$ and $L_{12}$. Other curl balancing embodiments, of course, are available and should be evident to those skilled in the art.

Figure 11:
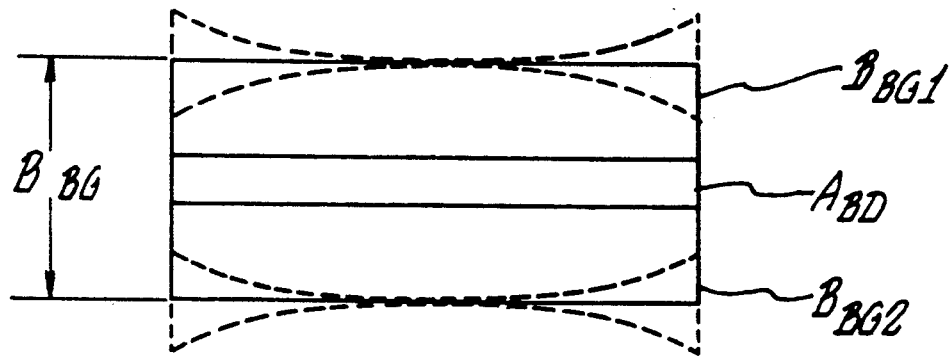
FIGS. 11 and 12 illustrate top views of three lines of material on a single layer which utilize curl balancing techniques.
Figure 12:
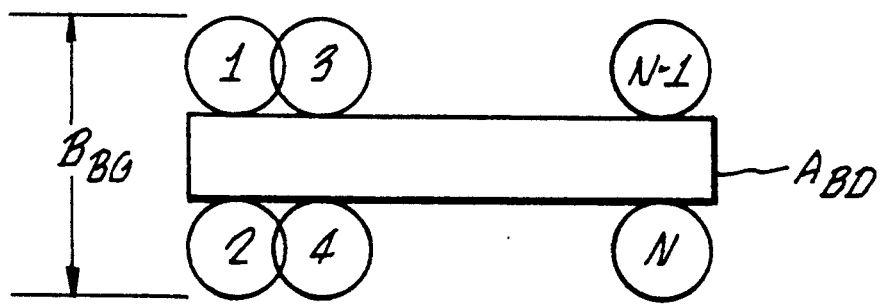

It is further noted that although the description of the curl balancing technique is presented with respect to upward vertical curl it is also applicable to other forms of curl including downward curl when a part is being built upside down, sideways and curl when a part is being built sideways, various forms of horizontal curl or curl in a plane perpendicular to the building axis when lines of transformed material are formed in contact with each other on a single layer. For example, as illustrated in FIG. 11 which shows the top view of a vertical layer, a core or balanced line $A_{BD}$ is transformed using a tightly focused beam of synergistic stimulation. Subsequently, a balancing line $B_{BG}$ is transformed using a less focused beam thereby resulting in a transformed balancing line having a first portion $B_{BG1}$ and a second portion $B_{BG2}$ that balances potential horizontal curl as indicated by the dashed lines. Alternatively, as illustrated in FIG. 12, alternative sides of the balanced line $A_{BD}$ can be successively transformed as indicated by the transformed areas 1, 2, 3, and 4 to form a balancing line $B_{BG}$. Thus, alternative sides of the balanced line $A_{BD}$ will be successively transformed until the end of the balancing layer $B_{BG}$ is reached and the last area N is transformed.

As described herein before, a single material and synergistic stimulation source combination can be used to effectively practice curl balancing even when a variety of layer thicknesses are used in forming objects. This material and synergistic stimulation source combination may be used in a two layer embodiment or a multiple layer embodiment to most effectively eliminate curl for a given layer thickness. Alternatively, the range of applicability of a single material to a particular embodiment (e.g. two layer embodiment) can be substantially increased by utilizing different penetration depths of the synergistic stimulation with the material. For example, a given UV curable material may have a longer penetration depth with one wavelength and shorter penetration depth with another wavelength. The longer penetration depth can be applied to two layer embodiments having relatively thick layers whereas, the shorter penetration depths can be applied to two layer embodiments having relatively thinner layers. Thus, if a given material has a penetration depth of 7 mils with a first wavelength and a penetration depth of 1-3 mils with a second wavelength, this material and first wavelength may be effectively applied to 20 mil layer thicknesses whereas the material and second wavelength may be effectively applied to 5 or 10 mil layer thicknesses.

Additionally, other embodiments may be developed wherein the balanced and balancing layers may be cured using different penetration depths. For example, the balanced layer may be cured with shorter penetration depth radiation to make it more rigid whereas the balancing layer may be cured using the longer penetration depth radiation to more quickly obtain the desired cure depth (as long as the curl balancing effect remains). The determination of appropriate wavelengths and cure parameters can readily be obtained by the previously discussed empirical or theoretical methods, wherein the penetration depths will also be one of the variables.

These curl balancing techniques may be effectively applied to eliminate or reduce curl when stereolithographically building a part. Up to this point the curl balancing techniques have been described as being implemented into the stereolithography process while slicing the three-dimensional object into layers. It is, however, important to realize that the methods of curl balancing can be implemented from a variety of points in the process.

An object design having a particular shape and size may be represented by a physical design such as data on a CAD system, a physical model or a mental image. This initial design generally is not based on the method that will be used to physically produce or reproduce the object and, therefore, it may be modified for purposes of production. For example, the design may be modified so that all vertical features are thicker than the building layer thickness to be used in forming the object. In terms of the present invention the original design may be modified for implementation of curl balancing methods. For example, the down-facing features to be curl balanced may be moved up one or more layers above the desired locations and an equivalent feature may be created one layer above the modified down-facing feature position. Then the modified down-facing feature can be given a balanced layer exposure and cure depth while the equivalent feature can be given a balancing layer exposure and cure depth wherein the combined exposures would lead to a cure depth which results in the down-facing feature being placed at the proper vertical position of the original object design. Such modifications are to be included in the methods and apparatus of the present invention.

In the stereolithography process the object design may be modified into a building design and thereafter sliced into individual cross-sections which will be used to form the object. Modifications during slicing or after slicing to the cross-sections can be made for the purpose of curl balancing. Examples of such modifications have been described previously. These modifications may be performed by a computer or the like programmed to introduce desired changes or separation of curl balancing regions and therefore fall within the scope of the method and apparatus of the present invention.

After formation of the cross-sectional data or object parameter information which corresponds to the object to be formed (with or without deviations for curl balancing from an original data set), the object can be stereolithographically produced by a building program. The data or parameter information can be further modified or manipulated to result in curl balancing methods of formation of the object. Such manipulation can include the specification and control of exposure parameters, or even the determination of regions to treat as curl balanced or curl balancing regions.

In summary, the scope of the curl balancing methods of the present invention include modifications to the original object design (i.e. modifications from a desired object configuration) through modifications during the building process of the object. The scope of the curl balancing apparatus of the present invention include apparatus that modify an original physical (CAD design or the like) object design through apparatus that build the object using curl balancing parameters.

Thus, an improved stereolithographic method and apparatus is disclosed for producing a three-dimensional object by applying synergistic stimulation to form successive layers of a building material wherein distortion of the object due to curl is substantially reduced or eliminated through curl balancing. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. An improved stereolithographic apparatus for producing a three-dimensional object from a material curable in response to synergistic stimulation including means for forming layers of said material and means for selectively applying said synergistic stimulation to said layers of said material to form said three-dimensional object from a plurality of cured layers of material, the improvement comprising:

means for curing a balanced layer and then curing a balancing layer in relation to said balanced layer such that reverse curl of said balanced layer caused by said balancing layer substantially offsets normal curl of said balanced layer caused by said balancing layer.

2. The improved stereolithographic apparatus of claim 1 further comprising means for curing said balanced layer and said balancing layer to form a desired net cure thickness.

3. The improved stereolithographic apparatus of claim 1 wherein said means for curing a balanced layer comprises means for curing an initial balanced layer and an initial balancing layer which are cured in relation to each other to form said balanced layer.

4. The improved stereolithographic apparatus of claim 1 further comprising means for curing the balanced layer to a cure depth less than a balanced layer thickness.

5. The improved stereolithographic apparatus of claim 1 further comprising means for curing the balanced layer to a cure depth equal to a balanced layer thickness and for curing said balancing layer to a cure depth greater than a balancing layer thickness.

6. The improved stereolithographic apparatus of claim 1 further comprising means for curing the balancing layer to a cure depth less than a desired net cure thickness.

7. The improved stereolithographic apparatus of claim 1 further comprising means for curing said balancing layer to a depth equal to a desired net cure thickness.

8. An improved stereolithographic method for producing a three-dimensional object from a material curable in response to synergistic stimulation including the steps of forming layers of said material, selectively applying said synergistic stimulation to said layers to form said three-dimensional object from a plurality of cured layers of material, the improvement comprising the step of:

curing a balanced layer and then curing a balancing layer in relation to said balanced layer such that reverse curl of said balanced layer caused by said balancing layer substantially offsets normal curl of said balanced layer caused by said balancing layer.

9. The improved stereolithographic method of claim 8 wherein said balanced layer and said balancing layer form a desired net cure thickness.

10. The improved method of claim 8 wherein said step of curing said balanced layer further comprises the steps of curing an initial balanced layer and curing an initial balancing layer in relation to each other to form said balanced layer.

11. The improved stereolithographic method of claim 8 wherein the balanced layer is cured to a depth less than a balanced layer thickness.

12. The improved stereolithographic method of claim 8 wherein said balanced layer is cured to a depth equal to a balanced layer thickness and said balancing layer is cured to a depth greater than a balancing layer thickness.

13. The improved stereolithographic method of claim 8 wherein said balancing layer is cured to a depth less than a desired net cure thickness.

14. The improved stereolithographic method of claim 8 wherein said balancing layer is cured to a depth equal to a desired net cure thickness.

15. A method of determining a range of optimum balancing layer cure depths for a balanced layer cure depth, a balanced layer thickness, and a balancing layer thickness for curl balancing for stereolithographic applications, comprising the steps of:

specifying said balanced layer cure depth;
specifying said balanced layer thickness;
specifying said balancing layer thickness; and
determining said range of optimum balancing layer cure depths for curl balancing based on known material properties and said balanced layer cure depth, said balanced layer thickness and said balancing layer thickness.

16. A method of determining a range of optimum balancing layer cure depths for a balanced layer thickness, a balancing layer thickness, and a balanced layer cure depth for curl balancing for stereolithographic applications, comprising the steps of:

specifying said balanced layer thickness;
specifying said balancing layer thickness;
specifying said balanced layer cure depth; and
stereolithographically forming a series of test parts having said balanced layer thickness, said balancing layer thickness and said balanced layer cure depth to determine said range of optimum balancing layer cure depths for adequate curl balancing results.

17. A method of determining a range of optimum balanced layer cure depths for a balanced layer thickness, a balancing layer thickness, and a balancing layer cure depth for curl balancing for stereolithographic applications, comprising the steps of:

specifying said balanced layer thickness;
specifying said balancing layer thickness;
specifying said balancing layer cure depth; and
stereolithographically forming a series of test parts having said balanced layer thickness, said balancing layer thickness, and said balancing layer cure depth, to determine aid range of optimum balanced layer cure depths for adequate curl balancing results.

18. A method for producing a three-dimensional object by applying synergistic stimulation to successive layers of material curable in response to said synergistic stimulation comprising the steps of:

(a) dividing a three-dimensional object into a plurality of cross-sections;
(b) identifying curl balancing regions and curl balanced regions existing on said cross-sections;
(c) exposing a surface of said curable material to a pattern of synergistic stimulation corresponding to a cross-section of said object to form a respective layer of said object;
(d) coating the layer formed in step (c) with said curable material to provide a surface of said curable material thereon;
(e) repeating steps (c) and (d) until said object is formed;
(f) exposing a curl balanced region to synergistic stimulation wherein exposure thereof induces a cure depth less than the thickness of a layer of said object;
(g) exposing a curl balancing region to synergistic stimulation in relation to said curl balanced region wherein exposure of said balancing region is sufficient to induce a cure depth equal to the thickness of two layers of the object while substantially eliminating curl.

19. An improved stereolithographic apparatus for producing a three-dimensional object from a material curable in response to synergistic stimulation including means for forming layers of said material and means for selectively applying said synergistic stimulation to said layers of said material to form said three-dimensional object from a plurality of cured layers of material, the improvement comprising:

at least one computer programmed to cure at least a first portion of at least one of said layers of material as a balanced layer, and programmed to then cure at least a second portion of at least one of said layers of material as a balancing layer in relation to said first portion wherein reverse curl of said first portion caused by curing of said second portion substantially offsets normal curl of said first portion caused by said curing of said second portion.

20. An improved stereolithographic method for producing a three-dimensional object from a material curable in response to synergistic stimulation including the steps of forming layers of said material, selectively applying said synergistic stimulation to said layers to form said three-dimensional object from a plurality of cured layers of material, the improvement comprising the steps of:

curing at least a first portion of at least one of said layers of material as a balanced layer, and
then curing at least a second portion of at least one of said layers of material as a balancing layer in relation to said first portion, wherein reverse curl of said first portion caused by curing of said second portion substantially offsets normal curl of said first portion caused by said second portion.

21. The apparatus of claim 1 wherein said means for curing said balanced layer cures at least two adjacent layers of material and said means for curing said balancing layer cures at least one other layer of material.

22. The method of claim 8 wherein said step of curing said balanced layer comprises curing at least two adjacent layers of material and said step of curing said balancing layer comprises curing at least one other layer of material.

23. The apparatus of claim 1 wherein said means for selectively applying said synergistic stimulation distinguishes a first region of a layer of material which serves as a balanced layer, and a second region of said layer of material which serves as a balancing layer.

24. The method of claim 8 wherein said step of applying said synergistic stimulation includes distinguishing a first region of a layer of material which serves as a balanced layer and a second region of said layer of material which serves as a balancing layer.

25. The apparatus of claim 19 wherein said computer cures said balanced layer using a first penetration depth and cures said balancing layer using a second penetration depth.

26. The method of claim 20 wherein said step of curing said balanced layer uses a first penetration depth and said step of curing said balancing layer uses a second penetration depth.

* * * * *